No. 874,218. PATENTED DEC. 17, 1907.
W. P. LUTZ.
PLANT AND VEGETABLE BROODER AND GROWER.
APPLICATION FILED AUG. 26, 1907.
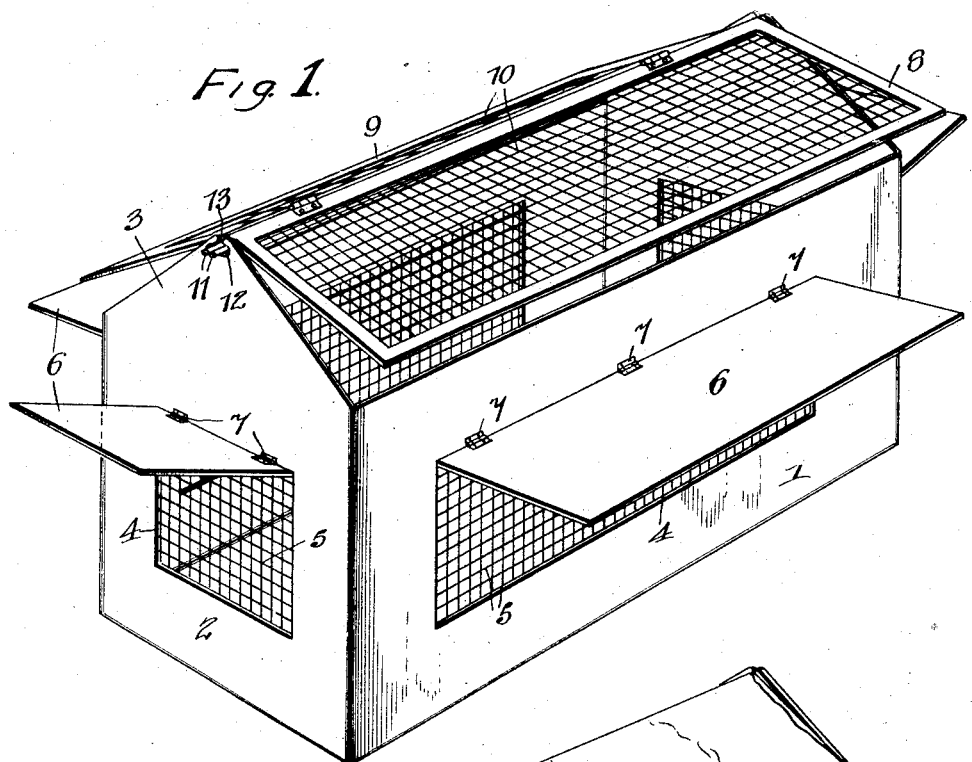
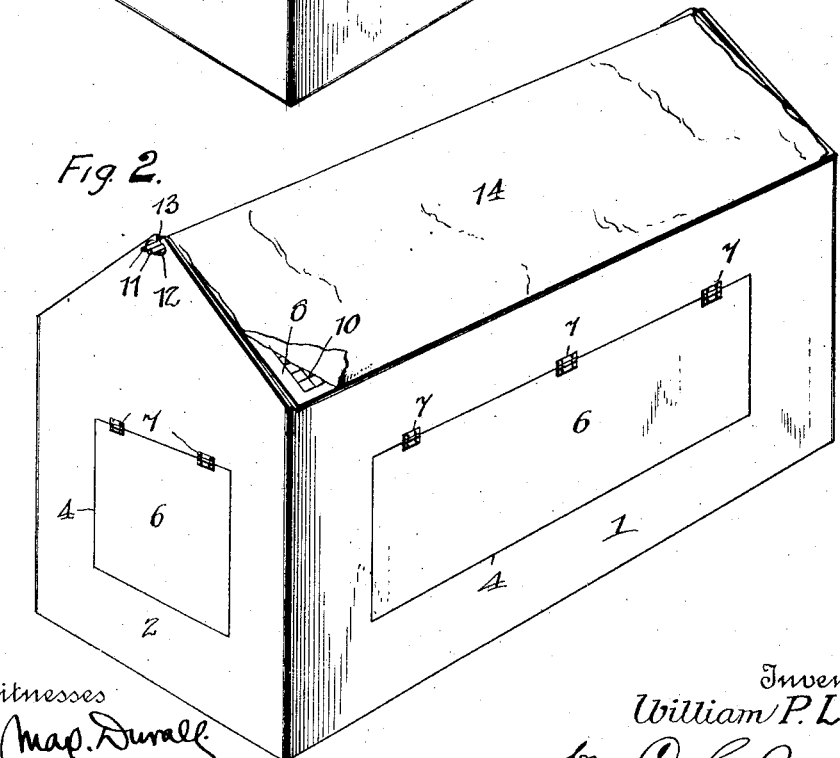
Witnesses
W. Map. Duvall
Myron F. Cleary
Inventor
William P. Lutz,
by C. L. Parker
Attorney

UNITED STATES PATENT OFFICE.

WILLIAM P. LUTZ, OF ELIZABETH TOWNSHIP, MIAMI COUNTY, OHIO.

PLANT AND VEGETABLE BROODER AND GROWER.

No. 874,218.  Specification of Letters Patent.  Patented Dec. 17, 1907.

Application filed August 26, 1907. Serial No. 390,186.

*To all whom it may concern:*

Be it known that I, WILLIAM P. LUTZ, a citizen of the United States, residing in Elizabeth township, in the county of Miami and State of Ohio, have invented certain new and useful Improvements in Plant and Vegetable Brooders and Growers, of which the following is a specification.

My invention relates to a plant and vegetable brooder and grower, and particularly contemplates the provision of a construction of this character embodying novel protecting and ventilating means for the plants.

My invention resides specifically, in the features of construction and arrangement which will be hereinafter described with reference to the accompanying drawing, forming a part of this specification, in which like numerals are used to designate like parts in both of the figures, and in which, Figure 1, is a perspective view of my improved device, showing the top frame raised and with its cover removed, and the ventilator cover plates raised, and, Fig. 2, is a perspective view of the same, showing the top frame down and its cover in position, and the ventilator cover plates closed.

In the practical embodiment of my invention I provide a main frame, comprising side and end walls 1 and 2 respectively, the end walls 2 having tapering portions 3 extending above the side walls 1. The side and end walls 1 and 2 are provided with openings 4 cut therethrough, said openings 4 being covered on the inside of the walls with wire mesh or other foraminous material 5, and being designed for use as ventilators for the plants or vegetable over which the main frame is placed. The ventilator openings 4 are further provided with cover plates 6 fitting therein and hinged at 7 to the side and end walls 1 and 2 to be raised or lowered as desired.

The main frame is provided with a cover frame comprising hinged frames 8 and 9 lying between the portions 3 of the end walls 2 and over-lapping the side walls 1. The frames 8 and 9 have their body portion composed of wire mesh or other foraminous material 10, and are provided upon their adjacent edges at each end with pins 11 projecting therefrom and through widened openings 12 formed in the portions 3 of the walls 2 adjacent their apices. The openings 12 have reduced mouths 13, by which the pins 11 may be inserted and removed, by swinging one of the frames 8 and 9 upwardly until its pin 11 is above the pin 11 of the opposite frame. The cover frame is thereby removably secured in position, and as shown, is provided with a cover 14 of a suitable textile material detachably secured thereon.

From the above description it will be readily apparent that my device is especially advantageous in rainy weather; in hot weather when it rains the roots of the plants rot, which may be prevented with my device by opening the ventilators and slightly raising the cover frame; in cold weather the plant freezes which may be prevented with my device by closing all the ventilators and the cover frame.

Having thus fully described my invention, what I claim is,

1. In a device of the character described, the combination of a main frame comprising side and end walls having covered ventilating openings therein, said end walls extending above said side walls, and a cover frame comprising foraminous sections hinged to one another and removably secured between said upper portions of said end walls, above said side walls and resting upon the upper edge of said side walls, substantially as described.

2. In a device of the character described, the combination of a main frame comprising side and end walls having covered ventilating openings therein, said end walls extending above said side walls and tapering thereabove to form central apices, and a cover frame comprising foraminous sections hinged to one another and removably secured between said end walls adjacent their apices and having their outer portions resting on the upper edges of said side walls, substantially as described.

3. In a device of the character described, the combination of a main frame comprising side and end walls having ventilating openings therein covered with a foraminous material and provided with outer opaque covers hinged to said walls, said end walls extending above said side walls and tapering thereabove to form central apices, and a cover frame comprising foraminous sections hinged to one another and removably secured between said end walls adjacent their apices and a textile covering extending over both of said sections, substantially as described.

4. In a device of the character described, the combination of a main frame comprising side and end walls having covered ventilating openings therein, said end walls extending above said side walls and tapering thereabove to form central apices and having openings formed therein adjacent said apices provided with contracted mouths, and a cover frame comprising foraminous sections hinged to one another along their adjacent edges and provided with pins projecting therefrom adapted for insertion in said openings to hold said cover frame in position between said end walls, substantially as described.

5. In a device of the character described, the combination of a main frame comprising side and end walls having ventilating openings therein covered with a foraminous material and provided with outer opaque covers hinged to said walls, said end walls extending above said side walls and tapering thereabove to form central apices and having openings formed therein adjacent said apices, provided with contracted mouths, and a cover frame comprising foraminous sections hinged to one another along their adjacent edges and provided with pins projecting therefrom adapted for insertion in said openings to hold said cover frame in position between said end walls, and a textile covering extending over both of said sections, substantially as described.

In testimony whereof I affix my signature in presence of two witnesses.

WILLIAM P. LUTZ.

Witnesses:
F. C. GOODRICH,
E. B. SHILTS.